United States Patent Office 3,022,288
Patented Feb. 20, 1962

3,022,288
PROCESS FOR PREPARING CARBOXYLATEVINYL AND CARBOXYVINYL ETHERS OF POLYSACCHARIDES
Lee A. Miller, Dayton, Ohio, assignor to Monsanto Chemical Company, St. Louis, Mo., a corporation of Delaware
No Drawing. Filed June 29, 1959, Ser. No. 823,301
20 Claims. (Cl. 260—231)

This invention relates to carboxylatevinyl and carboxyvinyl ethers of polysaccharides and to a method for preparing same, and more particularly to carboxylatevinyl and carboxyvinyl ethers of cellulose and starch prepared by the reaction of cellulose and starch with a strongly basic hydroxide and a propiolate.

New and useful compositions have been discovered which are carboxylatevinyl and carboxyvinyl ethers of polysaccharides. Cellulose in various forms such as cotton, paper pulp etc. and starch are carboxylatevinylated by the method of the invention to produce new compositions which are particularly unique in the presence of the vinyl group.

Carboxyethyl cellulose ethers and the alkali metal salts thereof are well known in the art being described, e.g., in U.S. 2,332,048 and a number of other subsequently issued patents. The presence of the vinyl groups in the compositions of the invention, of course, provides important reactive sites, e.g., for crosslinking to very substantially modify the characteristics of the cellulose or other polysaccharide, or for other reactions associated with vinyl unsaturation. In addition the carboxyvinyl ethers of such polysaccharides as cellulose and starch have all the advantages heretofore recognized for the carboxyethyl ethers of these materials. It is well known, for example, that carboxyethyl cellulose ethers or the alkali metal salts thereof are useful as thickening agents for textile printing pastes, oil well drilling muds, latex dispersions, coating materials, as a protective colloid for preparing emulsions, dispersions, as a sizing and finishing agent for textiles, etc. Furthermore, a propiolate, such as methyl propiolate, is not used up by reaction with water as are carboxyethylating agents such as acrylonitrile.

It is an object of this invention to provide new and useful compositions which are carboxyvinyl and carboxylatevinyl ethers of polysaccharides.

It is another object of this invention to provide a method for making these new carboxyvinyl and carboxylatevinyl ethers of polysaccharides.

These and other objects of the invention will become apparent as the detailed description of the invention proceeds.

By the method of the invention are made carboxyvinyl and carboxylatevinyl ethers of polysaccharides such as cellulose, synthetic or natural, partially substituted cellulose, starch, partially substituted starches such as ethylene oxide treated starches, cellodextrins, chiten, glycogen, insulin, etc. These polysaccharides all include a number of glucose units or modified glucose units. The glucose units have —$CH_2OH$ groups which are subject to carboxylatevinylation, and modified glucose units, e.g., such as ethylene oxide treated starch will have —$CH_2CH_2OH$ units which are sites for carboxylatevinylation. The most useful compositions of the invention will have from about 0.01 to about 1.5 carboxyvinyl or carboxylatevinyl units per glucose units in the polysaccharides, preferably from about 0.05 to about 1 unit per glucose unit.

The method of the invention involves the reaction of a polysaccharide salt formed from a strongly basic hydroxide and a polysaccharide, with a propiolate to form a carboxylatevinyl ether of a polysaccharide, which is the carboxylate salt of the cation of the strongly basic hydroxide. The desired product can also be made by reacting a polysaccharide with an aqueous solution of a strongly basic hydroxide and a propiolate. In a preferred embodiment of the invention the aqueous solution of a strongly basic hydroxide is first reacted with the polysaccharide, most of the excess hydroxide is removed by centrifugation, filtration, squeezing between rollers, extraction, or the like, and then the methyl propiolate is reacted with the so-treated polysaccharide. It is preferred to react the propiolate with the polysaccharide in the presence of a solvent and diluent for propiolate which is not a solvent for the aqueous hydroxide to minimize hydrolysis of the propiolate to propiolic acid, and t-butanol or dioxane are quite satisfactory for this purpose. The free acid, i.e., the carboxyvinyl polysaccharide ether is formed by acidification of the carboxylate.

The propiolates useful in the process of the invention are compounds of the formula $R'C \equiv CCOOR$ wherein R is an alkyl group having from 1 to 22 carbon atoms, preferably a lower alkyl group (1 to 6 carbons), and R' is hydrogen or a hydrocarbon radical free of non-benzenoid unsaturation having from 1 to 6 carbon atoms. Non-benzenoid unsaturation is aliphatic or cycloaliphatic unsaturation as contrasted to benzenoid unsaturation which is aromatic unsaturation. An illustrative listing not meant to be limiting of suitable propiolates is as follows: methyl propiolate, ethyl tetrolate, n-propyl isopropylpropiolate, isopropyl n-propylpropiolate, n-butyl t-butylpropiolate, isobutyl n-butylpropiolate, t-butyl n-butylpropiolate, n-amyl propiolate, n-hexyl n-amylpropiolate, n-hexyl n-hexylpropiolate, methyl phenylpropiolate, methyl cyclohexylpropiolate, n-heptyl propiolate, n-octyl propiolate, isooctyl propiolate, ethylhexyl propiolate, n-nonyl propiolate, n-decyl propiolate, tridecyl propiolate, pentadecyl propiolate, heptadecyl propiolate, eicosyl propiolate, docosyl propiolate, etc. Among some of the long chain esters it has not been specified whether they are straight chain or branched, but it is intended to cover both and mixtures thereof. The oxo process which is well known produces mixtures of branched chain alcohols suitable for making these propiolates from propiolic acid or by ester exchange with short chain esters, and the straight chain alcohols useful for the same purpose are also well known.

It appears that the temperature of reaction is not critical in that the reaction will take place at room temperature (20°–25° C.) or lower on up to temperatures of about 100° C. or higher. Obviously a temperature will eventually be reached at which substantial decomposition of the reactants or products will occur, and it is desirable to operate the process below these temperatures.

For the strongly basic hydroxide there can be used any hydroxide of an alkali metal, such as sodium hydroxide, potassium hydroxide, lithium hydroxide, rubidium hydroxide or cesium hydroxide, preferably sodium, potassium or lithium hydroxide, or a strongly basic quaternary ammonium hydroxide, such as benzyl trimethyl ammonium hydroxide, dibenzyl dimethyl ammonium hydroxide, or the like, or a mixture of such hydroxides. For optimum efficiency it is preferred to use these hydroxides in aqueous solutions in concentrations of from about 10% to about 40% preferably from about 20% to about 30%. The amount of hydroxide required is at least equivalent to the amount of propiolate which reacts with the polysaccharide. Normally an excess of the hydroxide over and above this minimum amount will be used.

Normally it would be preferred to use an excess of propiolate over and above that necessary to produce the desired carboxylatevinylation, preferably from about 1 to about 5 units of propiolate are used per glucose unit in the polysaccharides treated depending on the amount of carboxylatevinylation that is desired. In cases where extremely small amounts of carboxylatevinylation are desired (of the order of 0.01 carboxylatevinyl unit per glucose unit), smaller amounts of propiolate than 1 unit per glucose unit in the polysaccharide are used. After the hydroxide and propiolate have been reacted with the polysaccharide, the carboxyvinyl polysaccharide ether can be isolated, if desired, by neutralizing the alkaline reaction mixture with an acid, such as acetic, hydrochloric, or sulfuric, and the salts and excess acid can be removed by washing the polysaccharide with water. The product can then be separated from the solvent, washed, and dried. Before neutralization with acid the product is in the form of the basic carboxylate salt of the cation of the strongly basic hydroxide.

For many applications the product need not be thus isolated. It can often be used in the form of the reaction mixture. For some applications it may be desirable only to neutralize the excess base, or to merely wash the excess base from the carboxylate product.

The invention will be more clearly understood from the following detailed description of specific examples thereof:

Example 1

A sample of 3.5 g. (0.02 moles) of finely divided cotton was stirred at 78° C. with a mixture of 200 ml. of t-butanol and 26 ml. of 40% sodium hydroxide for 30 minutes. Then 5.74 g. (0.07 mole or 3.5 moles/mole glucose in cotton assuming cotton is pure cellulose) of methyl propiolate was added. The reaction mixture which colored orange quickly after the addition of the propiolate was stirred at reflux (78° C.) for ½ hour. Then the stirring was discontinued and the reflux continued for an additional 1½ hours. At the end of the reflux period the cotton was filtered to remove most of the liquid. The cotton was then washed successively with five 100 ml. portions of 70% methanol and two 100 ml. portions of absolute methanol, and was dried in an oven at 65°–75° C. for 3 days. Before drying the cotton seemed to be slightly stronger and stiffer than the starting material and it was not soluble in cold or hot water or in cold or hot 5% sodium hydroxide. After drying the cotton was buff colored and weighed 4.5 g. (28% weight increase). The dried cotton had a harsh hand and appeared to be stronger and stiffer than the starting material.

The carboxylatevinyl product underwent no apparent change when samples were tested for solubility in dimethyl sulfoxide, dimethyl formamide and chloroform but swelled without dissolving in 75% acidic acid.

In exactly the same manner as the methyl propiolate experiment, a control experiment was made wherein the methyl propiolate addition was omitted. A mixture of 3.5 g. (0.02 mole) of finely divided cotton, 200 ml. of t-butanol and 26 ml. of 40% sodium hydroxide was heated at reflux for 2.5 hours. The reaction mixture yellowed slightly during the reflux period. After the reflux period the reaction mixture was filtered to remove most of the liquid from the cotton. The cotton was then washed successively with five 100 ml. portions of 70% aqueous methanol and two 100 ml. portions of absolute methanol. After the cotton was squeezed dry it did not appear to be stronger than the starting material although it was slightly harsher. The control product was dried for 3 days at about 75° C. The dried cotton weighed 3.3 g. and was the same color as the untreated cotton. This control sample treated only with the sodium hydroxide and not the methyl propiolate does not appear to swell in 75% aqueous acetic acid as does the carboxylatevinyl compound. It is noted that whereas the control sample did not gain in weight but rather possibly lost weight the methyl propiolate treated sample gained appreciably in weight.

Analytical results on the methyl propiolate treated sample and the control sample were as follows:

| Percent | Treated | Control |
|---|---|---|
| C | 37.5 | 40.5 |
| H | 6.2 | 6.4 |
| Ash | 10.6 | 0.8 |

It was assumed that the ash was $Na_2O$ and that the ash of the control resulted from sodium hydroxide which was not completely washed out in the washing step. On this basis the net ash for the treated sample found by subtracting the ash of the control from the ash of the treated sample was 9.8%. Assuming that one $HC{\equiv}CCOONa$ unit was reacted with each glucose unit in the cellulose to give a material proportionally represented by the formula $C_9H_{11}O_7Na$ the ash of this material would be 12.2% (as $Na_2O$), 9.8/12.2=0.8 sodium carboxylatevinyl units per unit of glucose in the treated cellulose. Infrared analysis of the treated cotton as compared with the control cotton showed a strong band at 1580 cm.$^{-1}$ which is further evidence for the presence of the —CH=CHCOONa radical attached to the treated cotton. This particular band 1550–1610 cm.$^{-1}$ is indicated by the literature to be evidence for the —$CO_2^-$ group.

If it is desired to recover the product as the free acid rather than as the salt, the salt is acidified and the product cotton having about 0.8 carboxyvinyl units per unit of glucose therein, assuming the cotton to be pure cellulose, is recovered by conventional washing and drying techniques.

Example 2

A sample of 1.7 g. (0.01 mole) of finely chopped cotton was stirred for 3 hours at room temperature with 150 ml. of 30% sodium hydroxide. Then 2.52 g. (0.03 mole or 3 moles/mole glucose in cotton) of methyl propiolate was added and stirring was continued. After 24 hours an additional amount of 2.52 g. (0.3 mole) of methyl propiolate was added and the stirring was continued for an additional 24 hours. After the 48 hours reaction period the cotton was freed of most of the liquid by filtration. The cotton was then washed successively with four 100 ml. portions of 70% methanol and two 50 ml. portions of absolute methanol, and the washed cotton was dried at 75° C. for 4 hours. After drying the cotton weighed 11.9 g., a 12% weight increase. A sample of the dried treated product was analyzed to give the following results:

Percent: Treated
C _____ 42.2
H _____ 5.9
Ash _____ 5.3

The high ash value indicates that carboxylatevinylation has occurred. Further evidence of the carboxylatevinylation was from infrared analysis showing a strong band at 1580 cm.$^{-1}$ indicative of the —$CO_2^-$ group. Based upon the weight increase of the treated sample of Example 1 and the carboxylatevinyl units therein, the product of Example 2 has about 0.3 carboxylatevinyl units per unit of glucose in the cotton. The product as the free acid is recovered by acidifying, washing and drying as in Example 1.

Example 3

A mixture of 3.5 g. (0.02 mole) of finely divided cotton, 200 ml. of t-butanol and 26 ml. of 40% sodium hydroxide was shaken slowly at room temperature on a revolving wheel for 2 hours. Then 5.74 g. (0.7 mole or 3.5 moles/mole glucose in cotton) of methyl propiolate was added and the slow shaking was continued on the revolving wheel for 2 weeks. After the 2 weeks agitation period the cotton was substantially freed of liquid by filtration. The separated cotton was washed successively with five 100 ml. portions of 70% aqueous methanol and two 100 ml. portions of absolute methanol.

The washed cotton was dried in an oven at 75° for 3 hours and the dried product weighed 4.35 g., an increase of 0.85 g. or 24.2%.

The treated cotton was very harsh and crunched slightly on squeezing. Also it was very resilient and had a buff color. The weight increase in the treated sample as compared to the weight increase of the treated product of Example 1 and the carboxylatevinyl units therein, indicates that about 0.7 carboxylatevinyl units were added to the cotton per glucose unit in the product of this example. An infrared analysis of the product of Example 3 gave a strong band at 1580 cm.$^{-1}$ confirming the carboxylatevinylation. The product in free acid form is recovered by acidifying, washing and drying as in Example 1.

*Example 4*

This example illustrates the treatment of unbleached cotton muslin cloth with methyl propiolate. A 3.0 g. swatch of unbleached cotton muslin (6" x 6" with 128 threads/inch and 18 m. moles) was immersed in a mixture of 180 ml. of t-butanol and 25 ml. of 40% sodium hydroxide. This mixture was allowed to stand for 10 minutes at room temperature. Then 5.74 g. (0.07 mole or 4.0 units per glucose unit) of methyl propiolate was added and the reaction mixture was agitated on a revolving wheel for 24 hours. The orange colored supernatent liquid was decanted from the muslin swatch and the swatch was washed 5 times with 100 ml. portions of 70% aqueous methanol and twice with 100 ml. portions of absolute methanol. The swatch was then dried over night at 100° C. The weight of the dried swatch was 3.50 g.

This illustrates a control run with the cotton muslin. A swatch of 2.9 g. of unbleached cotton muslin similar to that used in the methyl propiolate treatment was immersed in a mixture of 180 ml. of t-butanol and 25 ml. of 40% aqueous sodium hydroxide. This mixture was agitated on a revolving wheel in a bottle for 24 hours at room temperature. The liquid was decanted from the swatch and the swatch was washed successively with five 100 ml. portions of 70% aqueous methanol and two 100 ml. portions of absolute methanol. Then the swatch was dried overnight at 100° C. The weight of the dried swatch was 2.75 g.

Analytical results on the untreated cotton, the sodium hydroxide treated cotton, and the methyl propiolate treated cotton were as follows:

| Percent | Untreated | Control | Treated |
|---|---|---|---|
| C | 42.4 | 40.9 | 38.7 |
| H | 6.4 | 7.14 | 6.5 |
| Ash |  | 2.3 | 11.34 |

The net ash determined by subtracting the ash of the control from the ash of the carboxylate-vinylated sample is 9.04%. Using the method of Example 1 with the ash being calculated as $Na_2O$, it is calculated that the product of Example 4 has 0.7 —CH=CHCOONa units per glucose unit.

Tensile strength tests were also run on the starting muslin, the control sample and the carboxyvinylated sample. The results were as follows:

Average, pounds
Starting muslin _____ 26
Control sample _____ 27
Carboxyvinylated sample _____ 25.5

It is indicated that for all practical purposes the tensile strength remains the same in the treated sample as compared to the starting muslin.

Also abrasion tests were run on the samples using a du Pont abrader with circles of very fine sandpaper. The sandpaper turned against the fabric at 36 r.p.m. Since the wear was uneven on the two fabric swatches only one swatch mounted on the left was used in the test. The swatches in testing were mounted on rubber backing. Results were as follows:

(1) After 30 seconds a small hole was worn in all 6 samples of the untreated cotton. This amounted to 18 revolutions of the sandpaper wheel.

(2) After 45 and 55 seconds (average 50 seconds) small holes were worn in two samples of the control or sodium hydroxide treated samples. This is in effect 30 revolutions of the sandpaper wheel against the cloth.

(3) After 65, 65 and 80 seconds (average 70 seconds) small holes were worn in 3 samples of carboxyvinylated material. One sample of carboxyvinylated material went 3 minutes before complete failure. For the 3 samples this is an average of 42 revolutions of the sandpaper wheel against the treated sample.

These differences in abrasion resistance with the methyl propiolate treated sample being superior are believed to be significant in indicating improved abrasion resistance for the carboxylate-vinylated muslin.

The product as the free acid is recovered by acidifying, washing and drying similarly to Example 1.

*Example 5*

A swatch of 6.0 g. (0.035 mole) of cotton (Indian Head fabric 7" x 7") was put into a test tube containing 40 ml. of 40% aqueous sodium hydroxide and allowed to stand at room temperature for 45 minutes. Then the excess sodium hydroxide was poured off and the swatch was spun dry in a basket type centrifuge till the weight of the swatch had dropped down to 14.0 g. after 10 minutes of centrifuging. Additional spinning in the centrifuge did not reduce the weight. The cloth at this time felt slightly damp to the touch.

The swatch was then folded in quarters and placed in a reaction vessel along with 200 ml. of t-butanol and 11.2 g. (0.13 mole or 3.5 units per glucose unit) of methyl propiolate was added. This mixture was heated at reflux for 2 hours. Shortly after the reflux began the reaction mixture yellowed and then turned orange.

A control swatch (5.8 g.) was treated precisely like the methyl propiolate treated fabric except that no methyl propiolate was added with the t-butanol.

The treated swatch and the control swatch were each separately washed with five 100 ml. portions of 70% aqueous methanol and two 100 ml. portions of absolute methanol. The treated tan swatch was extremely stiff and resembled canvas very closely. It had poor resistance to flexing, cracking occurring readily after a few bends. The control cotton (colorless) appeared to be little changed from the starting material. Both swatches were dried over night at 90° C. Immediately on removal from the oven the treated material weighed 9.95 g. However, it was extremely hygroscopic and weighed 11.10 g. after standing at room temperature for 15 minutes. No further increase was noted. The control cotton weighed 5.80 g. immediately upon removal from the oven and on standing for 15 minutes at room temperature the weight rose to 6.1 g. and stabilized there. Analysis of the treated and the control swatches yielded the following results:

| Percent | Treated | Control |
|---|---|---|
| C | 36.50 | 41.36 |
| H | 5.65 | 7.21 |
| Residue | 31.13 | 10.91 |

Using the residue data of 31.13 and subtracting the control residue of 10.91 the net residue for the treated sample of 20.22 is obtained. Using the method of Example 1 this calculates to be 1.8 carboxyvinyl units per unit of glucose in the treated sample, which is the highest yet obtained.

Samples of the control and of the treated swatch were washed with water. These water washed materials were then tested for tensile strength. The control sample had a tensile strength of 30 pounds as compared to 5 pounds for the treated sample. The washed treated material closely resembled a wool felt and was very soft.

Since the material changed so much on water washing it was resubmitted for residue determination. Presumably all, or most of the physically held material was washed out and only the chemical held material remained. The residue on the water washed treated sample was 23.04% calculated as sodium sulfate. Using the method of Example 1 this calculates to be 0.8 —CH=CHCOONa units/glucose unit.

Infrared analysis of the treated sample as compared to the control indicated the following additional bands for the treated sample: 1550 cm.$^{-1}$, 1250 cm.$^{-1}$, and 835 cm.$^{-1}$.

The product as the free acid or carboxy-vinylated cotton is recovered by acidifying, washing and drying as in Example 1.

*Example 6*

A swatch of 5.8 g. of Indian Head cotton (0.036 mole and 7″ x 7″) was put in a test tube containing 40 ml. of 20% aqueous sodium hydroxide and allowed to stand at room temperature for 3 hours. Then the sodium hydroxide solution was decanted and the swatch was centrifuged down to 12 g. in a basket type centrifuge. The treated swatch was then folded in quarters and refluxed for 1 hour with 200 ml. of commercial dioxane and 3.36 g. (0.04 mole or 1 unit/unit glucose) of methyl propiolate. The swatch yellowed shortly after reflux began.

A control swatch (6.0 g.) was treated in exactly the same manner, except that no methyl propiolate was added with the dioxane.

After the reflux period both swatches were washed individually with five 100 ml. portions of 70% aqueous methanol and two 100 ml. portions of anhydrous methanol. After the washing step, the swatches were dried at 90° C. over night. The weight of the treated cotton after drying was 6.65 g. and the weight of the control sample was 5.80 g. Analytical results on the control and the treated samples were as follows:

| Percent | Treated | Control |
|---|---|---|
| C | 39.30 | 41.96 |
| H | 6.16 | 6.85 |
| Residue | 8.35 | 1.95 |

The net residue for the treated sample, i.e., the difference between 8.35% and 1.95% was 6.40% as sodium sulfate. Calculation according to the method of Example 1 indicates 0.2 carboxylate vinyl units per glucose unit, were added to the treated swatch of cotton. Infrared analysis of the control and treated cotton showed 3 bands in the treated cotton which were not found in the control sample of cotton, namely, 1650, 1590 and 840 cm.$^{-1}$ bands. The product as the free acid rather than the salt is recovered by acidifying, washing and drying as in Example 1.

*Example 7*

This example illustrates the carboxylatevinylation of corn starch. A mixture of 6 g. of corn starch (0.037 mole) and 25 ml. of 40% aqueous KOH was allowed to stand at room temperature for 115 minutes. The resulting thick gel was added to a stirred mixture of 200 ml. of t-butanol and 11.30 g. (0.13 mole or 3.5 units/unit glucose) of methyl propiolate. The reaction mixture began to yellow and stirring was continued at room temperature for 20 hours. A control sample (6.0 g.) was run exactly like the treated sample, except that no methyl propiolate was added.

The treated yellow solid was freed from the reaction mixture by filtration, and the solid was washed successively with five 100 ml. portions of 70% aqueous methanol and two 100 ml. portions of absolute methanol. In both solvents this treated starch gave a homogeneous suspension. The washed solid was dried at 70° C.

The control material was worked up in exactly the same manner as the treated material to give a colorless, slightly tacky solid that did not give a homogeneous solution in aqueous methanol or water. This material also was dried at 70° C.

The dried treated material weighed 10.5 g. as compared to the dried control sample which weighed 4.5 g. The treated material was a brown brittle solid that suspended readily in water as compared with the control which was a white solid.

The sample of the dried treated material, 3 g. was suspended in three 100 ml. portions of water followed by filtration after each suspension. The material after the washing step was a colorless gel. Untreated starch washed in a similar manner does not form a gel. Analytical results of the various products were as follows:

| Percent | Control | Treated Methanol Washed | Treated Methanol and Water Washed |
|---|---|---|---|
| C | 40.76 | 37.55 | 34.93 |
| H | 6.92 | 4.76 | 5.84 |
| Residue | 5.17 | 36.11 | 31.52 |

The residues above were reported as percent sodium sulfate. Calculations were made using the method of Example 1, is showed 0.95 carboxylatevinyl units had been added per unit of glucose in the treated starch which had been methanol and water washed. Carboxyvinylated starch is recovered by acidifying the carboxylate, washing and drying.

*Example 8*

A sample of 200 ml. of t-butanol was added to 6.0 g. (0.037 mole) of corn starch. Then 2.5 ml. of 40% aqueous sodium hydroxide (0.025 mole) was added along with 4.2 g. (0.05 mole) of methyl propiolate. No discoloration occurred in the mixture. The mixture was stirred at room temperature for 2 hours and the treated material was filtered to remove most of the liquid and slurried with three 100 ml. portions of water. A control sample was run in an identical manner except that no methyl propiolate was added. The treated material of this example does not gel as did the treated material of Example 7. After drying the treated sample was sent for residue determination. The residue on the treated sample as sodium sulfate was 4.18%. Calculations by the method of Example 1 indicate that 0.15 carboxyvinyl units have been substituted in the starch per glucose unit. The product starch is recovered in free acid form by acidifying, washing and drying.

*Example 9*

This example illustrates carboxylatevinylation of an ethylene oxide treated starch. The ethylene oxide treatment of the starch results in the attachment of hydroxy ethyl groups directly to the starch molecule by ether linkages. The particular modified starch used is known as Penford Gum 300. A process for the manufacture of these gums, is described in U.S. Patents 2,516,632, 2,516,633 and 2,516,634. A sample of 75 ml. of t-butanol was added to 6.0 g. (0.037 moles) of Penford Gum 300. The mixture was stirred vigorously while 6 ml. of 40% aqueous sodium hydroxide and 4.2 g. (0.05 mole) of methyl propiolate was added. Stirring was continued at room temperature for 3 hours, and a good suspension of the treated starch resulted. A control sample was run in an identical manner except that methyl propiolate was not added.

After the reaction period the treated starch was recovered by filtration, was washed with three 100 ml. portions of water and was dried at 20 mm. at 60° C. over night. The dried material was a pale yellow, easily filterable solid that swelled noticeably on contact with water or methanol.

The control was a very tacky colorless solid that could not be washed with water due to its tendency to form a colloidal solution.

The dried treated sample weighed 6.1 g. and was slightly hygroscopic, and the control sample weighed 4.7 g. and was also very slightly hygroscopic. The average residue for the treated sample was 11.54% as sodium sulfate. Calculations were not made as to the amount of carboxylatevinylation since a duplicate control could not be run. Infrared analysis of the control and the treated samples showed two bands present in the treated sample that were not found in the control sample. Namely, 1630 cm.$^{-1}$ and 1540 cm.$^{-1}$. In other words the infrared analysis confirms the fact that carboxylatevinylation has occurred in the treated sample.

The product in free acid form rather than salt form is recovered by acidifying, washing and drying.

*Example 10*

A sample of 6.24 g. (0.035 mole) of finely divided pulp (bleached kraft soft wood pulp containing 4.4% moisture) is put into a test tube containing 40 ml. of 40% sodium hydroxide solution and allowed to stand at room temperature for 45 minutes. At this time the excess sodium hydroxide is poured off and the pulp spun dry in a bucket type centrifuge.

The centrifuge pulp is then placed in a reaction vessel along with 200 ml. of t-butanol and 11.20 g. (0.13 mole or 3.5 units per unit of the glucose assuming the pulp is pure cellulose) of methyl propiolate. The reaction mixture is heated at reflux for 2 hours, and first it yellows and later turns orange.

A control sample of pulp is treated in precisely the same manner except that the methyl propiolate is not added.

After the 2 hours of reaction the treated pulp is removed from the bulk of the liquid by decantation or filtration, and the pulp is washed with five 100 ml. portions of 70% aqueous methanol and two 100 ml. portions of absolute methanol. Then the pulp is thoroughly washed with water, and dried at 90° C. overnight. The control sample of the pulp is treated in an identical manner in work-up.

The dried treated and control samples are then analyzed for residue from which data is calculated amount of carboxylatevinylation in carboxylatevinyl units per unit of glucose in the paper pulp. Infrared analysis confirms carboxylatevinylation.

If desired, the sodium carboxylatevinyl paper pulp ether product is converted to carboxyvinyl paper pulp ether by acidifying with, e.g., 10% acetic acid, the salts and excess acid are washed from the carboxy-vinyl product with water, the carboxyvinyl paper pulp ether product is separated from the water by filtration, centrifugation, decanting or the like, and the product is dried, preferably under vacuum at about 90° C. or less. The resulting product is of course the free acid form, or a carboxyvinyl paper pulp ether product.

*Example 11*

This example described the irradiation of a sample of carboxylatevinylated cellulose.

A sample of the treated product of Example 4 was irradiated with high speed electrons using a Van de Graff generator for a total beam time of 25 seconds over a period of 1½ minutes with precautions being taken to exclude air. The dose was $9.6 \times 10^6$ roentgens and the maximum temperature that the cellulose reached during irradiation was 40° C. The particular sample irradiated was calculated to have 0.74 carboxylatevinyl units per unit of glucose. A visual examination of the irradiated sample indicated that it had turned yellow and had developed a slightly sweet odor reminiscent of peroxide. Qualitatively it can be concluded that the carboxyvinylated cellulose had not deteriorated very substantially during the irradiation period.

Although the invention has been described in terms of specified embodiments which are set forth in considerable detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. The method of preparing a carboxylatevinyl ester of a polyhydroxy compound selected from the class consisting of cellulose, starches and hydroxyethylated starches which comprises reacting an alkali metal salt of the polyhydroxy compound with an alkyl propiolate having from 1 to 6 carbon atoms in the alkyl radical in the presence of a solvent for the propiolate.

2. The method of claim 1 in which the polyhydroxy compound is cellulose.

3. The method of claim 1 in which the polyhydroxy compound is starch.

4. The method of claim 1 in which the polyhydroxy compound is hydroxyethylated starch.

5. The method of preparing a carboxylatevinyl ester of a polyhydroxy compound selected from the class consisting of cellulose, starches and hydroxyethylated starches which comprises reacting said polyhydroxy compound with a strongly basic, aqueous solution of an alkali metal hydroxide and an alkyl propiolate having from 1 to 6 carbon atoms in the alkyl radical in the presence of a solvent for the propiolate, the amount of said hydroxide being at least equimolar with respect to the propiolate.

6. The method of claim 5 in which the polyhydroxy compound is cellulose.

7. The method of claim 5 in which the polyhydroxy compound is starch.

8. The method of claim 5 in which the polyhydroxy compound is hydroxyethylated starch.

9. The method of claim 5 in which the polyhydroxy compound is wood pulp.

10. The method of preparing a carboxylatevinyl ether of a polyhydroxy compound selected from the class consisting of cellulose, starches and hydroxyethylated starches which comprises reacting an alkyl propiolate having from 1 to 6 carbon atoms in the alkyl radical, with a salt of said polyhydroxy compound and a strongly basic hydroxide selected from the class consisting of alkali metal and quaternary ammonium hydroxides, in the presence of a solvent for the propiolate.

11. The method of preparing a carboxylatevinyl ether of a polyhydroxy compound selected from the class consisting of cellulose, starches and hydroxyethylated starches which comprises reacting said polyhydroxy compound with a strongly basic, aqueous solution of a hydroxide selected from the class consisting of alkali metal and quaternary ammonium hydroxides and an alkyl propiolate having from 1 to 6 carbon atoms, the amount of said hydroxide being at least equimolar with respect to the propiolate.

12. An alkali metal carboxylatevinyl ether of a polyhydroxy compound selected from the class consisting of cellulose, starches and hydroxyethylated starches.

13. A sodium carboxylatevinyl ether of a polyhydroxy compound selected from the class consisting of cellulose, starches and hydroxyethylated starches.

14. A carboxyvinyl ether of a polyhydroxy compound selected from the class consisting of cellulose, starches and hydroxyethylated starches.

15. An alkali metal carboxylatevinyl cellulose ether.
16. A sodium carboxylatevinyl cellulose ether.
17. A carboxyvinyl cellulose ether.
18. An alkali metal carboxylatevinyl starch ether.
19. A sodium carboxylatevinyl starch ether.
20. A carboxyvinyl starch ether.

References Cited in the file of this patent

UNITED STATES PATENTS

| | | |
|---|---|---|
| 2,157,347 | Reppe et al. | May 9, 1939 |
| 2,332,048 | Bock et al. | Oct. 19, 1943 |
| 2,671,779 | Gaver et al. | Mar. 9, 1954 |

UNITED STATES PATENT OFFICE
CERTIFICATE OF CORRECTION

Patent No. 3,022,288 February 20, 1962

Lee A. Miller

It is hereby certified that error appears in the above numbered patent requiring correction and that the said Letters Patent should read as corrected below.

Column 10, lines 18 and 31, for "ester", each occurrence, read -- ether --.

Signed and sealed this 13th day of November 1962.

(SEAL)
Attest:

ERNEST W. SWIDER
Attesting Officer

DAVID L. LADD
Commissioner of Patents